March 25, 1958     R. C. WILLIAMS     2,827,987
FRICTION WEDGE FOR STABILIZED CAR TRUCK
Filed March 5, 1956
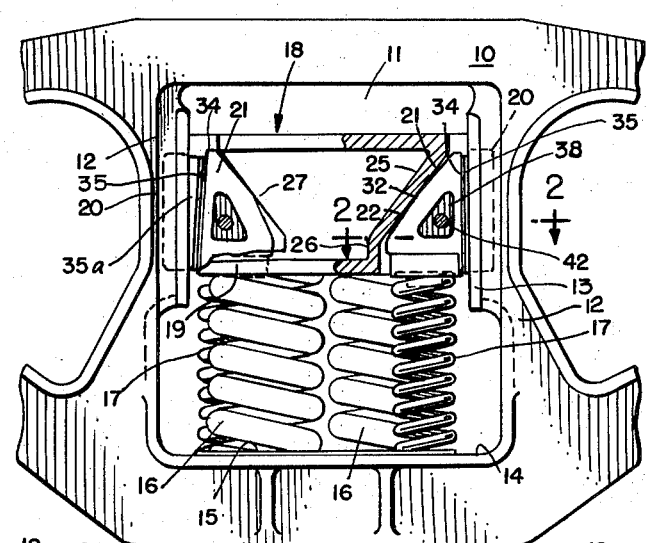
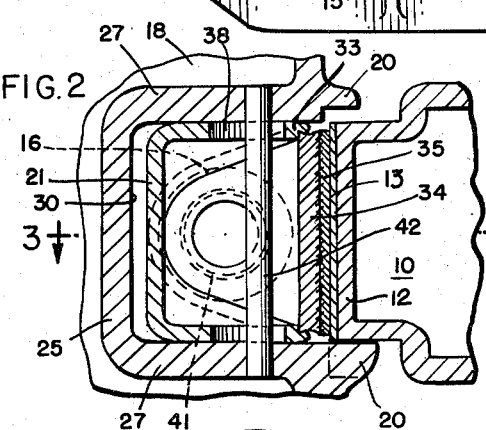
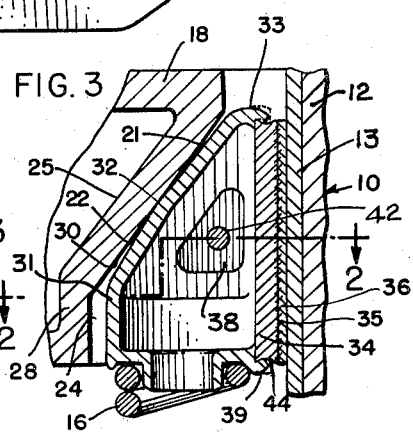
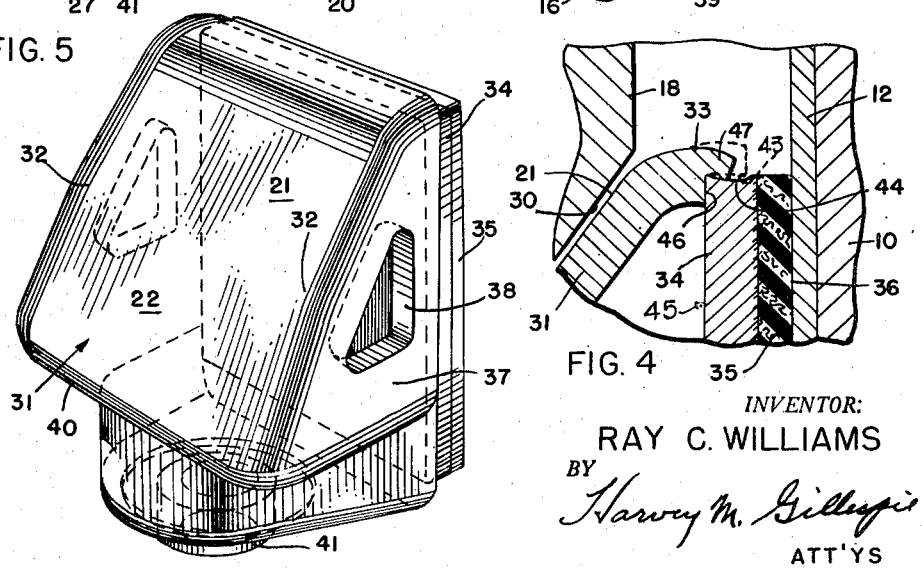
INVENTOR:
RAY C. WILLIAMS
BY
Harvey M. Gillespie
ATT'YS

United States Patent Office 2,827,987
Patented Mar. 25, 1958

2,827,987

FRICTION WEDGE FOR STABILIZED CAR TRUCK

Ray C. Williams, Chicago, Ill., assignor to Standard Car Truck Company, Chicago, Ill., a corporation of New Jersey Application March 5, 1956, Serial No. 569,476

8 Claims. (Cl. 188—251)

The present invention relates to stabilized car trucks and more particularly to an improved friction wedge member of the type currently employed to damp or retard the vertical movements of the truck bolster and thus avoid excessive compression and rebound of the load springs which support the truck bolster and thereby support the car body. The invention is also concerned with a novel method of constructing such friction wedge members whereby the same may be economically manufactured in comparatively large quantity with extremely uniform results.

Wedge members of this character are usually in the form of hollow steel castings and therefore, have possessed certain limitations arising principally from the fact that certain portions thereof are subject to greater wear than other portions as a result of friction, thus materially shortening the useful life of the wedge. To overcome this objection it has been heretofore proposed that the friction face of the body of the wedge and its friction face element or lining should be made as separate elements; the friction face element being made of hardened steel and securely welded to the body element to complete the wedge structure. While this expedient has been regarded as an advance in the art, it too has certain limitations principal among which are, the high cost of the hardened steel friction face element which is subject to direct friction and consequent wear and the difficulties and high labor costs involved in removing the welded plates from the wedge body and rewelding new plates to the body.

The present invention is designed to overcome the above noted limitations that are attendant upon the use of present day unitary cast metal wedges of this character and of the sectional wedges heretofore proposed, toward this end, it contemplates the provision of a wedge, either as a unitary or a sectional casting or forging, provided with a friction face composed of a textile or fabric or other base material treated in a special manner to impart to it substantially higher frictional characteristics than those present in metal-to-metal contact and thereby provide greater damping force than is obtainable with friction wedge construction now in general use. The friction pad is bonded or otherwise secured to a separate face plate which is secured to the wedge so as to become a part thereof and may be composed of a lower grade steel plate than heretofore required for sectional wedges.

The present invention is made by a novel method of attaching the face plate and friction pad assembly to the separately formed body of the wedge so that the friction pad will occupy its proper position with respect to cooperating wear plates on the truck frame, when the car truck is assembled. This method is predicated upon the fact that the face plate, although of appreciable thickness, is sheared from a sheet of metal stock and that during the shearing operation a limited amount of extrusion takes place by the operation of the shearing dies so that the sheared edge, instead of presenting a flat surface normal to the plane of the stock, is slightly recessed so that a curved surface in transverse cross section is generated along this edge. According to the present method, the hollow wedge is formed so as to leave one face thereof open, thus providing a rectangular rim which is internally recessed to provide a forwardly facing shoulder. The sheared plate is inserted into the recess provided in the rim opening of the wedge so as to close the open side of the wedge and, thereafter, the extreme edge portions of the rim are beaded or otherwise turned over to force said rim into the curved void provided on the edge of the plate and the plate is thus securely held in position over the open side of the wedge so as to become a permanent part of the wedge assembly.

The friction pad may be bonded or otherwise applied to the outwardly facing surface of the face plate either prior to its assembly on the wedge casting or after such assembly. In either event, when the wedge assembly is installed in a car truck, the friction pad will cooperate with the wear plates or other friction surfaces on the side frames of the truck to effect a snubbing action which is more efficient than has heretofore been attainable with metal-to-metal friction surfaces. Not only will the present wedge assembly produce a more efficient snubbing action, but additionally, less wear will take place at the friction surfaces, thus prolonging the life of the wedges and also the wear plates currently applied to the truck frame and cooperating with the friction wedges.

The provision of a wedge member of the character briefly outlined above and possessing the enumerated advantages thereof being among the principal objects of the invention, numerous other objects and advantages, not at this time enumerated, will become readily apparent as the following description ensues.

In the accompanying drawing forming a part of this specification a preferred embodiment of the invention has been shown.

In the drawing:

Fig. 1 is a fragmentary side elevational view of a portion of a stabilized railway car truck embodying the principles of the present invention and in which certain improved friction wedges are employed to damp the vertical movements of the truck bolster.

Fig. 2 is an enlarged sectional view taken substantially along the line 2—2 of Fig. 1 and Fig. 3.

Fig. 3 is a sectional view taken substantially along the line 3—3 of Fig. 2.

Fig. 4 is an enlarged detail view of a portion of the structure shown in Fig. 3 and showing the manner in which certain friction facing material employed in connection with the present invention is secured to one of the friction wedges, and Fig. 5 is an enlarged perspective view of one of the friction wedges with the friction facing operatively applied thereto.

Referring now to the drawing in detail, the improved friction wedge comprising the present invention is illustrated herein in connection with a stabilized car truck in which the truck bolster has a capacity for limited movement transversely of the truck, the particular form of truck illustrated being purely exemplary. The truck involves in its general organization a side frame 10 having a bolster window 11 therein. The side frame 10 includes bolster columns 12 to which wear plates 13 are applied, the latter being secured to the columns in any suitable manner.

The tension member of the side frame 10 is provided with projecting flanges 14 at the bottom of the bolster window 11 which form a relatively wide spring seat upon which there is supported a lower spring cap 15. A group of four relatively heavy load springs 16 of conventional design is supported on the cap 15, the spacing between the outer and inner pairs of springs being such as to accommodate a pair of stabilizing springs 17 of lighter construction than the springs 16 and which are similarly supported upon the spring cap 15. The stabilizing springs 17 are of appreciably greater length than the length of the bolster springs 15 when the latter are in their free state.

Interposed between the two opposite side frames 10 of the car truck is a bloster 18 of truss configuration, the central part of the bolster being of appreciably greater depth than the end regions thereof. This bolster 18 is of hollow construction and the bottom 19 thereof forms the tension member for the bolster.

The opposite ends of the bolster 18 are similarly formed and each end is adapted to be received within the bolster window 11 of the opposite side frames 10 of the truck. Thus, for practical purposes, a description of one end of the bolster 18 will suffice for the other. A pair of spaced vertical flanges 20 project outwardly in opposite directions from the opposite sides of the end of the bolster and these flanges overlap the sides of the columns 12 to limit movement of the bolster laterally of the frame. The end portion of the bolster is supported on the four bolster springs 16. A pair of pockets 24 are formed in the opposite sides of the bolster and project inwardly from the side faces thereof. The inner sides of the pockets 24 are bounded by diagonally inclined webs 25 which extend downwardly and inwardly from the top side edges of the bolster toward the central vertical longitudinal plane of the bolster. The inclined webs 25 merge with short vertical webs 26 which extend to the bottom 19 of the bolster 18.

Nested within the pockets 24 and interposed between the inclined surfaces 30 thereof and the opposing wear plates 13 of the columns 12, are the improved wedge or stabilizing members 31 which, in the main, constitute the present invention. One of the wedge members 31 is illustrated in detail in Fig. 5 and, as seen in this view, each wedge member has inclined surfaces 21, 22 which merge into a cylindrical crown portion 32 near the center of the wedge. This crowned portion 32 bears against and cooperates with the opposed inclined surface 30 of the bolster 18. The outer side of the wedge member 31 is of open configuration and provides a generally rectangular rim 33 which lies in a vertical plane. Secured around the edge of the rim 33 in a manner that will be made clear presently is a vertical face plate 34 which is generally rectangular and this face plate has secured to its outer side a non-ferrous friction face element 35. The friction face is preferably, though not necessarily, formed of a treated fabric and may be similar in its construction to many commercial brake lining materials now on the market for automotive and other uses. The friction face element 35 is substantially coextensive with the outer face of the face plate 34 and is bonded to the latter by means of a suitable adhesive or by a vulcanization process, as desired. The friction material 35 is compressed between the face plate 34 and the wear plate 13 and is designed to make flat sliding frictional contact with this latter wear plate in a manner and for a purpose that will be made clear subsequently.

The cylindrical crown 32 of the wedge member 31 bears against the inclined wall 30 of its associated pocket at a control location and thereby insures flat surface contact between the friction surface 36 of the facing strip 35 and the wear plate 13 for all tilted positions of the bolster relative to the wear plates 13. However, in the event that the co-engagement between the wedge member 31 and the inclined surface 30 of the bolster is such that the face plate 34 stands at an angle to the wear plate 12 as shown at the left of Fig. 1, the thickness of the pad may be varied as indicated at 35a to compensate for the angular position of the face plate and thereby insure a flat friction of the pad 35 against the wear plate 13.

The wedge member 31 is of hollow construction and further includes generally triangular side walls 37 having triangular cut-out portions 38 and a bottom wall 40. The bottom wall 40 is formed with a pair of circular bosses 41 providing spring centering devices over which the upper ends of the stabilizing springs 17 may be received.

The wedge members 31 are loosely secured to the bolster 18 to facilitate ease of assembly of the bolster and wedge members and, toward this end, a tie rod in the form of an elongated bolt 42 extends laterally through the triangular openings 38 in each wedge member and has its ends secured in the vertical webs 27. The triangular openings 38 are sufficiently large as to permit limited up and down movement of wedge members relative to the tie rods 42.

Referring now to Fig. 4, it will be seen that as initially formed the hollow wedge member 31 is provided with an internal recess 43 (shown in dotted lines) on the inside of the rim portion 33 thereof and the extreme rim portion assumes the dotted line configuration illustrated. The rectangular face plate 34 is relatively thick and, in the manufacture thereof, it is sheared by a heavy shearing press from a blank of metal stock. It is a phenomenon of any shearing operation, where relatively thick sheet metal is concerned, that as the shearing die cuts through the metal stock a limited amount of extrusion takes place by means of which a tapered and slightly curved edge surface area such as is shown at 44 is generated at the sheared edges of the severed part. According to the present invention, the shearing dies are selected so that after the shearing operation on the face plate 34 has been performed, the maximum overall width of the plate between the opposed pairs of sheared edges is such that the plate will fit snugly within the recess 43 on all sides with the larger face 45 thereof seating on the shoulder 46 of the recess 43. The outer rim or thin lip portion 47 of the wedge member is then beaded or otherwise pressed inwardly to its full line position against the curved surfaces of the face plate edges and in this manner that face plate is securely held in position over the open side of the triangular wedge member.

In the assembled truck, the bolster springs 16 serve to support the bolster ends while the stabilizing springs support the stabilizing wedge members 31 and a small portion of the bolster load. Vertical movement of the bolster ends, together with the wedge members 31 associated therewith may take place relative to the adjacent side frame 10 and the wear plates 13. When downward movement of a bolster end occurs, the inclined surface 30 of the bolster 18 bears against the surface 32 of the wedge member and forces the latter into tighter wedging relation with respect to the surface 30 and the wear plate 13. This wedging action increases the frictional engagement between the working face or friction surface 36 of the friction face element or wear pad and an extremely effective damping action takes place which is sufficient to prevent the bolster springs 16 from excessive oscillations. In this manner cumulative harmonic action of the springs 16 as the truck passes over the rail joints is prevented and the truck will travel smoothly at all speeds.

The friction wear pads 35, bearing against the metal surface of the wear plate 13, give a more efficient snubbing action to the wedge members 31 than can be attained by metal-to-metal friction surfaces. Furthermore, the face place 34 is capable of replacement although such replacement need seldom be resorted to, since the friction pad 35 is the wear element of the wedge and it may be replaced, from time to time, either with or without the removal of the plate element 34.

While the invention has been shown and described herein in connection with certain specific structures, these structures may be varied without departures from the scope of the invention except as to the claims which may be expressly limited to the structures shown.

I claim:

1. A railway car truck friction wedge comprising a hollow metal body formed with an inclined face portion on one side, the other side being open and defining a surrounding rim, said rim being recessed around its inner edge to define an outwardly facing shoulder, a vertically disposed face plate having its edge regions telescopically received within said rim and seating against said shoulder coextensively therewith, said face plate closing said open side, an interlocking means on said rim and edge regions of the face plate for anchoring the face plate in position within the rim.

2. A railway car truck friction wedge comprising a hollow metal body formed with an inclined face portion on one side, the other side being open and defining a surrounding generally rectangular rim, said rim being recessed around its inner edge to define an outwardly facing shoulder surrounded by a thin lip portion, a vertically disposed rectangular face plate having its edge regions telescopically received within said rim and seating against said shoulder coextensively therewith, said face plate closing said open side, said lip portion of the rim being flanged inwardly and engaging the peripheral edge of the face plate and serving to retain the face plate in position within said rim recess.

3. A railway car truck friction wedge as claimed in claim 1 including, additionally, a non-ferrous friction pad having good friction characteristics bonded to the outer surface of said face plate and substantially coextensive with said latter surface.

4. A railway car truck friction wedge as defined in claim 2 characterized in that the friction pad includes a fabric content.

5. A railway car truck friction wedge comprising a hollow metal body formed with an inclined face portion on one side, the other side being open and defining a surrounding generally rectangular rim, said rim being recessed around its inner edge to define a forwardly facing shoulder surrounded by a thin lip portion, a vertically disposed rectangular face plate having its edge regions telescopically received within said rim and seating against said shoulder coextensively therewith, said face plate closing said open side, the peripheral edge of said face plate being provided with a void forwardly of the rear face of said plate, said lip portion of the rim being flanged inwardly and entering said void to clamp the face plate firmly in position within said rim recess.

6. A railway car truck friction wedge as claimed in claim 5 including, additionally, a non-ferrous friction pad including compressed fibers bonded to the outer surface of said face plate and substantially coextensive with said latter surface.

7. A railway car truck friction wedge comprising a hollow metal body formed with oppositely inclined face portions on one side and having a cylindrical crowned portion at the junction of the inclined face portions, the other side being open and defining a surrounding generally rectangular rim, said rim being recessed around its inner edge to define a forwardly facing shoulder surrounded by a thin lip portion, a vertically disposed rectangular face plate having its edge regions telescopically received within said lip portion and seating against said shoulder coextensively therewith, said face plate closing said open side, the peripheral edge of said face plate sloping forwardly and inwardly from the rear face of the plate toward the front face thereof, said lip portion of the rim being flanged over the extreme rear edge region of the plate and engaging said forwardly sloping peripheral edge to clamp the face plate firmly in position within said lip portion of the rim and against said shoulder under compression.

8. A railway car truck friction wedge as claimed in claim 7 including, additionally, a non-ferrous fabric content friction pad bonded to the front face of said face plate.

References Cited in the file of this patent

UNITED STATES PATENTS

| | | |
|---|---|---|
| 1,631,077 | Wellman | May 31, 1927 |
| 2,529,235 | Tack | Nov. 7, 1950 |
| 2,564,346 | Shaw | Aug. 14, 1951 |